United States Patent [19]

Austin

[11] 3,929,771
[45] Dec. 30, 1975

[54] REACTIVE DYESTUFFS

[75] Inventor: Peter William Austin, Manchester, England

[73] Assignee: Imperial Chemical Industries Limited, London, England

[22] Filed: Mar. 21, 1974

[21] Appl. No.: 453,634

[30] Foreign Application Priority Data
May 9, 1973 United Kingdom............... 22148/73

[52] U.S. Cl. .... 260/240 R; 260/240 B; 260/240 CA
[51] Int. Cl.² ............... C07D 213/46; C07D 211/86
[58] Field of Search ........ 260/240 G, 240 B, 240 R, 260/281, 240 CA, 240 C

[56] References Cited
UNITED STATES PATENTS

| | | | |
|---|---|---|---|
| 2,096,295 | 10/1937 | Eckert et al. ........................ | 260/281 |
| 2,901,476 | 8/1959 | Gold et al. ............... | 260/240 C UX |
| 2,914,531 | 11/1959 | Staeuble et al. ................ | 260/281 X |
| 3,714,151 | 1/1973 | Lyness........................... | 260/240 CA |
| 3,759,900 | 9/1973 | Horstmann............... | 260/240 CA X |

OTHER PUBLICATIONS
Pereyaslova et al., "Azomethane Derivatives of Aminophenylimides of some Dicarboxylic Acids," in Chem. Abs., Vol. 64, 1966, 14143a.

*Primary Examiner*—Allen B. Curtis
*Attorney, Agent, or Firm*—Cushman, Darby & Cushman

[57] ABSTRACT

Dyestuffs of the formula:

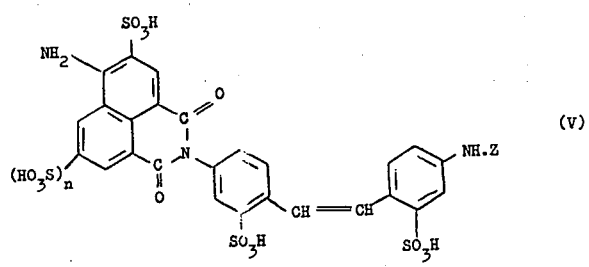

(V)

are cellulose-reactive dyes useful for colouring cellulose and polyamide textile materials in brilliant fluorescent greenish-yellow shades of excellent fastness to washing and a reasonable fastness to light. They also have good resistance to wet fading and to oxidative coppering.

4 Claims, No Drawings

REACTIVE DYESTUFFS

This invention relates to new reactive dyestuffs, and more particularly to new reactive dyestuffs of the peri-dicarboxylic acid imide series.

It has been proposed in UK Specification No. 883337 to manufacture dyestuffs of the peri-dicarboxylic acid imide series, which dyestuffs contain at least one acid group imparting solubility in water and the grouping of the formula

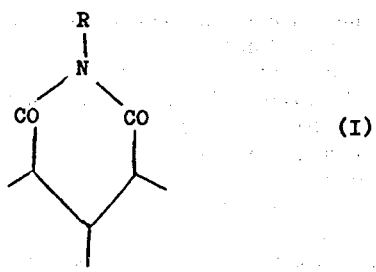

(I)

wherein the carbon atoms to which the carbonyl groups are attached form part of a naphthalene residue, which may be fused with other benzene rings, and in which R represents an aryl group substituted by the grouping of the formula

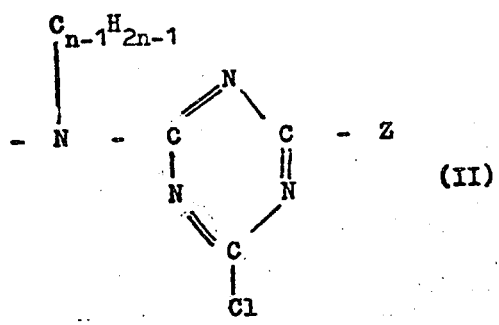

(II)

in which $n$ represents a whole number not greater than 5 and Z represents a chlorine atom, a substituted or unsubstituted hydroxyl group, or a substituted or unsubstituted amino group. Z may be an amino group substituted by an alkyl or oxyalkyl group, for example an oxyethyl group, or a colourless or coloured aryl residue, especially an aryl residue containing a group imparting solubility in water. These dyestuffs are obtained by reacting a peri-dicarboxylic acid imide dyestuff which contains the grouping of the formula

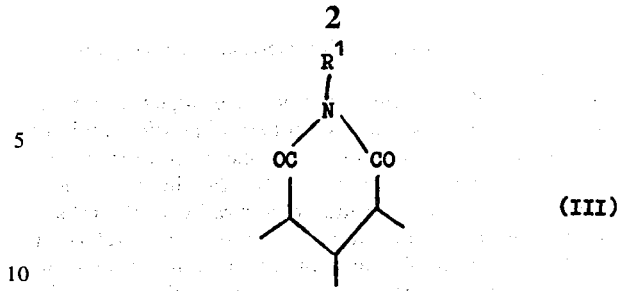

(III)

wherein the carbon atoms to which the carbonyl groups are attached form part of a naphthalene residue, which may be fused with other benzene rings, and in which $R^1$ represents an aryl group substituted by the grouping of the formula $$- NHC_{n-1}H_{2n-1}$$

in which $n$ represents a whole number up to 5, with cyanuric chloride or a primary condensation product thereof which contains two chlorine atoms and, in place of the third chlorine atom, a substituted or unsubstituted hydroxyl group, or a substituted or unsubstituted amino group. The specification proposes, e.g., to utilise compounds of the formula:

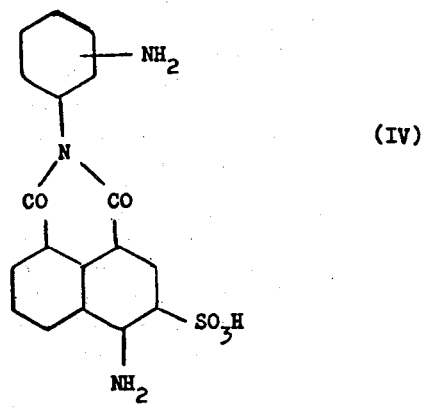

(IV)

However the dyestuffs which are obtained in such a manner, or from the corresponding compounds in which the benzene ring also carries a sulphonic acid group have very poor fastness to light.

It has now been found that valuable dyestuffs having superior fastness to light are obtained by replacing the benzene nucleus in formula (IV) (optionally with a further sulphonic acid substituent in the second ring) by a disulphostilbene radical.

Thus, according to the present invention there are provided dyestuffs of the formula:

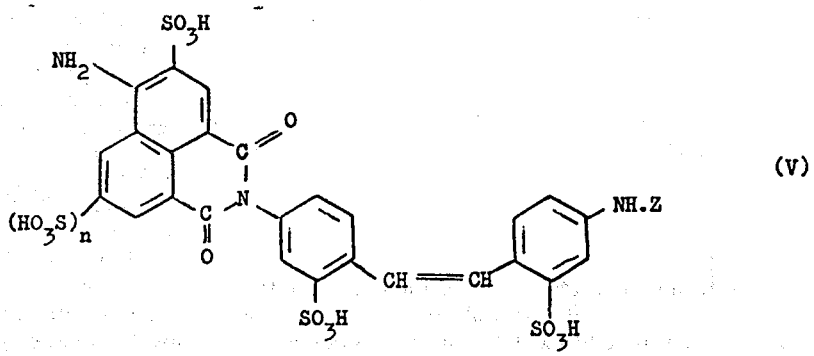

(V)

wherein Z represents a cellulose-reactive group and $n$ is 0 or 1.

As examples of cellulose-reactive groups represented by Z, there may be mentioned aliphatic sulphone groups which contain a sulphate ester group in $\beta$-position to the sulphur atom, e.g. the $\beta$-sulphatoethylsulphone group, $\alpha,\beta$-unsaturated acyl radicals of aliphatic carboxylic acids for example, acrylic acid, $\alpha$-chloroacrylic acid, propiolic acid, maleic acid and mono- and dichloromaleic acids; also the acyl radicals of acids which contain a substituent which reacts with cellulose in the presence of an alkali, e.g. the radical of a halogenated aliphatic acid such as chloroacetic acid, $\beta$-chloro and $\beta$-bromo-propionic acids and $\alpha,\beta$-dichloro- and dibromo-propionic acids. Other examples of cellulose or polyamide-reactive groups are tetrafluorocyclobutane carbonyl, trifluorocyclobutene carbonyl, tetrafluorocyclobutylethenyl carbonyl, trifluorocyclobuteneethenyl carbonyl, and heterocyclic radicals which contain 2 or 3 nitrogen atoms in the heterocyclic ring and at least one cellulose- or polyamide-reactive substituent on a carbon atom of the ring.

As examples of such heterocyclic radicals, there may be mentioned, for example
2:3-dichloro-quinoxaline-5- or -6-sulphonyl,
2:3-dichloro-quinoxaline-5- or -6-carbonyl,
2:4-dichloro-quinazoline-6- or -7-sulphonyl,
2:4:6-trichloro-quinazoline-7- or -8-sulphonyl,
2:4:7- or 2:4:8-trichloro-quinazoline-6-sulphonyl,
2:4-dichloro-quinazoline-6-carbonyl,
1:4-dichloro-phthalazine16-carbonyl,
4:5-dichloro-pyridaz-6-on-1-yl,
2:4-difluoro-5-chloropyrimid-6-yl,
2:4-dichloro-pyrimidine-5-carbonyl,
2-methyl-sulphonyl-5-chloro-6-methylpyrimid-4-yl,
4(4:5-dichloro-pyridaz-6-on-1-yl)benzoyl,
4-(4:5-dichloro-pyridaz-6-on-1-yl)phenylsulphonyl,
and, more particularly s-triazin-2-yl and pyrimidin-2-yl or -4-yl radicals which contain on at least one of the remaining 2-, 4- and 6-positions, a bromine or, preferably, a chlorine atom, a sulphonic acid group, a thiocyanato group, an aryloxy or arylthio group containing an electronegative substituent such as sulphophenoxy, sulphophenylthio, nitrosulphophenoxy, disulphophenoxy and sulphonaphthoxy, or a group of the formula:

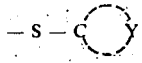 (VI)

wherein Y represents a group of atoms necessary to form a 5- or 6-membered heterocyclic ring which may carry substituents or form part of a fused ring system; or a quaternary ammonium or pyridinium group; of a group of the formula:

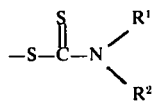 (VII)

wherein $R^1$ and $R^2$ each represents the same or different alkyl, cycloalkyl, aryl or aralkyl group, or $R^1$ and $R^2$ together form, together with the nitrogen atom, a 5- or 6-membered heterocyclic ring; or a group of the formula:

 (VIII)

wherein $R^3$ and $R^4$ may be the same or different and each represents a hydrogen atom or an alkyl, aryl or aralkyl group.

In the cases where the pyrimidine ring or triazine ring carries only one such reactive substituent, the said ring may have a non-reactive substituent on the remaining carbon atoms.

By a non-reactive substituent there is meant a group which is bound by a covalent bond to a carbon atom of the triazine or pyrimidine nucleus, which covalent bond is not ruptured under the conditions used for application of the reactive dye.

As examples of such substituents, there may be mentioned, for example, primary amino and hydroxyl groups, also mono- or disubstituted amino groups, etherified hydroxyl and etherified mercapto groups; in the case of substituted amino groups, this class includes for example, mono- and di-alkylamino groups in which the alkyl groups preferably contain at most 4 carbon atoms, and which may also contain substituents for example, hydroxyl or alkoxy groups, and phenylamino preferably sulphonated phenylamino which may be further substituted on the nucleus, e.g. by $CH_3$, $OCH_3$, $CO_2H$ or Cl, or on the N atom e.g. by methyl, ethyl, hydroxyethyl or sulphomethyl, and naphthylamino groups preferably sulphonated naphthylamino containing up to 3 $SO_3H$ groups; in the case of etherified hydroxyl and mercapto groups, this class includes, for example, alkoxy and alkylthio groups preferably those of low molecular weight, i.e. having up to 4 carbon atoms and phenoxy, sulphonated phenoxy, phenylthio, naphthoxy or naphthylthio groups; as particular examples of all these classes there may be mentioned for example:
methylamino,
ethylamino,
dimethylamino,
$\beta$-hydroxyethylamino,
di-($\beta$-hydroxyethyl)-amino,
$\beta$-chloroethylamino,
cyclohexylamino,
anilino,
o-, m- and p-sulphophenylamino,
2,4-, 2,5- and 3,5-disulphophenylamino,
N-methylsulphophenylamino,
N-$\beta$-hydroxyethylsulphophenylamino,
mono-, di- and tri-sulphonaphthylamino,
4- and 5-sulpho-o-tolylamino,
2-carboxyphenylamino and 5-sulpho-2-carboxyphenylamino,
N-$\omega$-sulphomethylphenylamino,
methoxy, ethoxy, and butoxy,
phenoxy, p-sulphophenoxy and chlorophenoxy and phenylthio groups.

Chlorine atoms or cyano, nitro, carboxy and carbalkoxy groups in the 5-position of a pyrimidyl radical come into the category of non-reactive substituents.

If desired, a non-reactive substituent may itself be the residue of a coloured amine, e.g. of the azo, anthraquinone or phthalocyanine series. Dyes of this kind have the basic bright yellow shade provided by the naph-

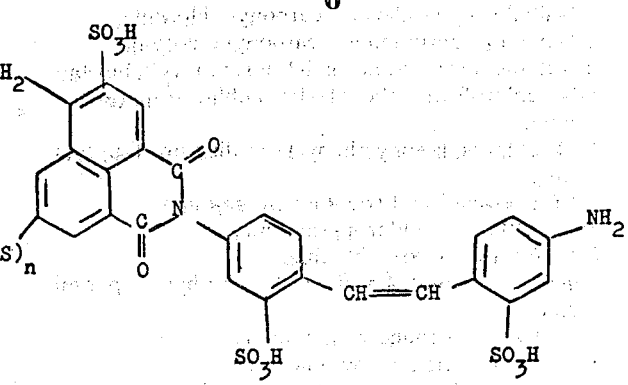

(X)

thalimide nucleus modified by the shade of the second chromophoric group.

Furthermore, a non-reactive substituent may contain a reactive grouping; into this category come, e.g. anilino or naphthylamino groups substituted by a β-sulphatoethylsulphonyl, β-sulphatoethylsulphonylamino or β-chloroethylsulphonyl group, or more especially, diamine radicals of the formula:

either wherein $R^5$ and $R^6$ independently represent H or alkyl or hydroxyalkyl radicals having up to 4 carbon atoms, and Q represents an aliphatic or aromatic linking group, or

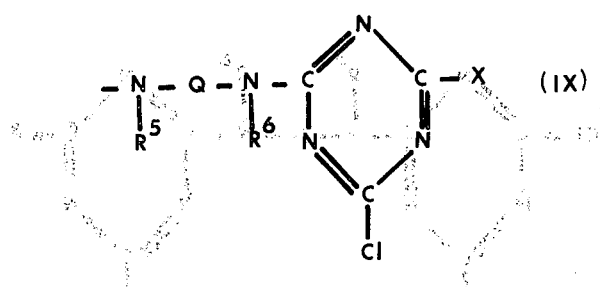

represents the N,N'-piperazinylene radical, and X represents Cl, $OCH_3$, $NH_2$ or an anilino or sulphonated anilino radical which may be further substituted by Cl, $CH_3$, $OCH_3$ or $CO_2H$, or a sulphonated naphthylamine radical.

As examples of radicals represented by Q in formula (IX) there may be mentioned alkylene, poly(alkyleneimine), or dialkyloxide radicals, e.g.

ethylene,
propylene,
tri-, tetra- and hexa-methylene,
—$C_2H_4NHC_2H_4$—
—$C_2H_4(NHC_2H_4)_2$—
—$C_2H_4OC_2H_4$— or a divalent aromatic radical of the benzene or naphthalene series which preferably contains 1 or 2 $SO_3H$ groups, e.g. a mono- or di-sulpho-m-phenylene, mono- or di-sulpho-p-phenylene or a disulphonaphthylene radical, or a divalent radical of the stilbene, diphenyloxide, diphenylmethane, diphenylurea, diphenoxyethane or diphenylamine series which preferably contains 1 or 2 $SO_3H$ groups.

The invention also provides a process for manufacture of the new dyestuffs which comprises reacting a compound of the formula:

with the anhydride or halide of an acid of which the acid radical contains a substituent capable of chemically reacting with the fibre to form a chemical bond, or a heterocyclic compound which contains a halogen atom attached to a carbon atom of the heterocyclic nucleus and also a reactive substituent of the kind just stated.

The above process can conveniently be carried out by stirring a mixture of the reactants in an aqueous medium at a suitable temperature, which may be from 0°C in the case of cyanuric chloride to 50°C or even higher in the case of less reactive acyl halides, anhydrides or hetercyclic compounds. As a general rule it is preferred to add an acid-binding agent during the course of the reaction to maintain the pH within the limits 5 to 8.

The compounds of formula (X) used in the above process can in general be obtained by reacting 4-amino-1,8-naphthalic anhydride-3-sulphonic or 3,6-disulphonic acids with 4-amino-4'-nitrostilbene-2,2'-disulphonic acid and reducing the resulting compound to convert the nitro group to amino, or with 4-acetylamino-4'-aminostilbene-2,2'-disulphonic acid and subsequent hydrolysis.

As examples of halides or anhydrides of acids or heterocyclic compounds which may be used, there may be mentioned, for example, carbyl sulphate and the anhydrides or acid halides of α,β-unsaturated aliphatic acids such as chloromaleic anhydride, propiolyl chloride and acryloyl chloride, the acid chlorides of halogenated aliphatic acids, e.g.

chloroacetyl chloride,
sulphochloroacetyl chloride,
β-bromo- and β-chloro-propionyl chlorides,
α,β-dichloro- and dibromo-propionyl chlorides,
2,2,3,3-tetrafluorocyclobutane carbonyl chloride,
β-(2,2,3,3-tetrafluorocyclobutyl)acryloyl chloride,
2,3,3-trifluorocyclobut-1-ene carbonyl chloride,
β-(2,3,3-trifluorocyclobut-1-enyl)acrylyl chloride,
also heterocyclic compounds which contain at least 2 nitrogen atoms in the heterocyclic rings and which contain 2 or more halogen, especially chlorine atoms in the ortho position to the nitrogen atoms, e.g.

2:3-dichloro-quinoxaline-5- and -6-carbonyl chlorides,
2:3-dichloroquinoxaline-5- and -6-sulphonyl chlorides,
2:4-dichloro-quinazoline-6- and -7-sulphonyl chlorides,
2:4:6-trichloro-quinazoline-7- and -8-sulphonyl chlorides,
2:4:7- and 2:4:8-trichloro-quinazoline-6-sulphonyl chlorides,
2:4-dichloro-quinazoline-6-carbonyl chloride, 1:4-dichloro-phthalazin-6-carbonyl chloride,
2:4-dichloro-pyrimidine-5-carbonyl chloride,
β-(4:5-dichloro-pyridazonyl-1-)propionyl chloride,
1-(4'-chloroformylphenyl)-4:5-dichloro-6-pyridazone,
1-(4'-chlorosulphonylphenyl)-4:5-dichloro-6-pyridazone,
2:4:6-tribromo- and trichloro-pyrimidines,
2:4:6-trifluoro-5-chloropyrimidine,
2:4:5:6-tetrachloropyrimidine,
2-methylsulphonyl-4,5-dichloro-6-methyl pyrimidine,
5-methyl-2:4:6-trichloropyrimidine,
5-nitro-2:4:6-trichloropyrimidine,
2:4-dichloro-5-nitro-6-methyl-pyrimidine,
2:4-dichloro-5-nitropyrimidine,
2:4:6-trichloro-5-cyanopyrimidine,
5-ethoxycarbonyl-2:4-dichloropyrimidine,
2:4-dichloropyrimidine-5-carbonyl chloride,
cyanuric bromide,
cyanuric chloride, also the primary condensation products of cyanuric bromide or cyanuric chloride with ammonia, an alkali metal sulphite or thiocyanate or an organic mercaptan, hydroxy compound or an organic primary or secondary amine, for example:
methanol,
ethanol,
iso-propanol,
phenol,
o-, m- and p-chlorophenols,
o-, m- and p-cresols,
o-, m- and p-sulphophenols,
thiophenol,
thioglycollic acid,
di-methyldithiocarbamic acid,
mercaptobenzthiazole,
thioacetamide,
methylamine,
dimethylamine,
ethylamine,
diethylamine,
n-propylamine,
iso-propylamine,
butylamine,
hexyl- and cyclohexyl-amines,
toluidine,
piperidine,
morpholine,
methoxyethylamine,
ethanolamine,
aminoacetic acid,
aniline-2:4-, 2:5- and 3:5-disulphic acids,
orthanilic, metanilic and sulphanilic acids,
2-, 3- and 4-aminobenzoic acids,
4- and 5-sulpho-2-amionbenzoic acids,
4- and 5-sulpho-o-toluidines,
5-amino-2-hydroxybenzoic acid,
2-amino-ethanesulphonic acid,
amino-naphthalene mono- and di-sulphonic acids,
N-methylaminoethane sulphonic acid,
m-aminophenyl-β-sulphatoethyl sulphone,
2-methoxy-5-β-sulphatoethyl sulphonyl aniline,
m-β-chloroethylaminosulphonyl aniline,
also the primary condensation products of cyanuric chloride with coloured amines, e.g. of the aminoazo, aminoanthraquinone or aminophthalocyanine series;

also, the secondary condensation products of cyanuric chloride with:
alkali metal sulphites,
alkali metal thiocyanates,
phenols and thiophenols,
containing an electronegative substituent, and compounds of the formulae:

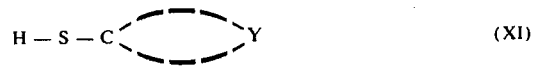   (XI)

   (XII)

and

   (XIII)

wherein Y, $R^1$, $R^2$, $R^3$ and $R^4$ have the meaning stated above.

Reactive groups of formula (IX) above can be introduced by using a bis-triazinyl diamine of the formula:

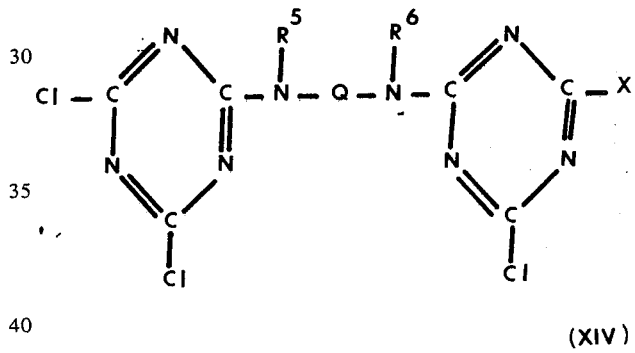

(XIV)

wherein $R^5$, $R^6$, Q and X have the meanings stated in connection with formula (IX) i.e. the condensation product of 2 moles of cyanuric chloride, or of 1 mole of cyanuric chloride and 1 mole of a triazine of the formula:

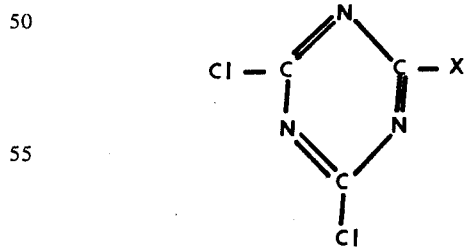

with one mole of a diamine of formula
$NHR^5 - Q - NHR^6$   (XVI)

As examples of diamines of formula (XVI), there may be mentioned:
piperazine,
aliphatic diamines, e.g. alkylene diamines and other α,ω-diamino aliphatic compounds, e.g.
ethylene diamine,
1,2- and 1,3-propylene diamines,
1,6-hexylene diamine,
diethylene triamine,
triethylene tetramine,
di-($\beta$-aminoethyl) ether,
aromatic diamines of the benzene and naphthalene series, more especially those containing 1 or 2 $SO_3H$ groups, e.g.:
m- and p-phenylenediamine,
1,3-phenylenediamine-4-sulphonic and 4,6-disulphonic acids,
1,4-phenylenediamine-2-sulphonic and 2,5-disulphonic acids,
2,6-naphthylene diamine-4-sulphonic and 4,8-disulphonic acids,
1,5-naphthylene diamine-2- and 4-sulphonic and 3,7-disulphonic acids,
4,4'-diaminodiphenyl-2-sulphonic and 2,2'-disulphonic acids,
4,4'-diaminostilbene-2,2'-disulphonic acid,
4,4'-diaminodiphenylurea-2,2'- and 3,3'-disulphonic acids,
4,4'-diaminodiphenylamine-2,2'-disulphonic acid,
4,4'-diaminodiphenoyxethane-2,2'-disulphonic acid,
4,4'-diaminodiphenylmethane-2,2'-disulphonic acid,
4,4'-diaminoazobenzene-2-sulphonic and 2,2'-disulphonic acids,
N-methyl and N-ethyl-1,4-phenylenediamine-2-sulphonic acids
N-($\beta$-hydroxyethyl)ethylene diamine.

The dyes of formula (V) wherein the cellulose-reactive group Z is a s-triazine nucleus substituted by a chlorine or bromine atom and an amino or substituted amino group can also be obtained by reacting a cellulose-reactive dye of formula (V) in which Z is a dichloro- or dibromo-s-triazine group with ammonia or an amine.

The cellulose-reactive dyes of formula (V) wherein the cellulose-reactive group is a s-triazine nucleus substituted by $SO_3H$, a quaternary ammonium group or a group of formulae (VI), (VII) and (VIII), can be obtained by reacting a cellulose-reactive dye of formula (V) containing a s-triazine group substituted by at least one chlorine or bromine atom with an alkali metal salt of sulphurous acid, a tertiary amine or a compound of formulae (XI), (XII) and (XIII).

These reactions also may be carried out by stirring the reactants together in an aqueous medium at a suitable temperature which, in general, will be within the range of 30°–95°C, and maintaining the pH at an appropriate value by addition of an acid-binding agent. In the case where ammonia or amine is the reactant, an excess can be used to act as acid-binding agent. Otherwise, sodium carbonate or sodium hydroxide may conveniently be used as acid-binding agent.

The dyes of formula (V) in which Z represents a group of formula (IX) may also be obtained by reacting a dyestuff of formula (V) in which Z represents the dichloro-s-triazine radical with one mole of a diamine of formula (XVI) and subsequently reacting the product with one mole of a s-triazine compound of formula (XV).

The new dyestuffs may be used for the colouration of a variety of textile materials, for example, natural proteins such as wool, silk and leather, superpolyamides and, more especially natural or regenerated cellulose textile materials such as cotton, linen and viscose rayon. For colouring the cellulose materials the dyestuffs are preferably applied by printing or dyeing the material in conjuction with a treatment with an acid-binding agent, e.g. caustic soda, sodium carbonate, sodium triphosphate or sodium silicate, which may be applied to the textile material before during or after the application of the dyestuff. When so applied the new dyestuffs react with the cellulose and yield primarily brilliant fluorescent greenish-yellow shades of excellent fastness to washing; other shades are obtained where a different chromophore is linked to the cellulose-reactive group. In contrast to azopyrazolone or azopyridone dyes of similar shade, the new dyes are distinguished by strong greenish-yellow fluorescence, extremely good resistance to wet fading either in self-shades or in admixture with reactive copper phthalocyanine turquoise dyes at pH 7 or pH 9, and, good resistance to oxidative coppering.

The invention is illustrated but not limited by the following Examples in which parts are by weight.

EXAMPLE 1

14.7 parts of 4-amino-3-sulpho-1,8-naphthalic anhydride and 19.4 parts of 4-amino-4'-nitrostilbene-2,2'-disulphonic acid are added to 400 parts of water and caustic liquor (70°Tw) is added until the pH is raised to 7. 8 Parts of crystalline sodium acetate are added and the mixture is stirred under reflux for 48 hours and cooled. Potassium acetate is added in an amount of 600 g/l and the precipitate is filtered off, stirred with ethanol and refiltered.

70 Parts of iron dust, 5 parts of ferrous chloride and 300 parts of water are stirred at 90° for ½ hour. 15 Parts of acetic acid are added followed by the product from the previous stage. 20 Parts of water and 1 part of ferrous chloride are added and the mixture is stirred vigorously at 90° for another 2 hours. Caustic liquor (70°Tw) is added until the mixture is just alkaline to Brilliant Yellow test paper, a little activated carbon is added and the mixture is filtered. Potassium acetate is added in amount of 600 g/l and the precipitate is filtered off, washed with ethanol and dried.

13.5 Parts of the product so obtained, 50 parts of ice, 1 part of dispersing agent and 100 parts of water are vigorously stirred at 0°–5°, pH 6–7 and a solution of 5 parts of cyanuric chloride in 15 parts of acetone is added. The suspension is stirred at 0°–5°, pH 6–7 for 2 hours, a solution of 6 parts of potassium dihydrogen orthophosphate and 3 parts of disodium hydrogen orthophosphate is added and the precipitate is collected by filtration, intimately mixed with 2 parts of sodium diethyl metanilate and dried in vacuo. Upon analysis the dyestuff is found to contain 2 moles of hydrolysable chlorine per mole of dyestuff and, when applied to cellulosic fibres in conjunction with an acid binding agent, to dye the fibres in bright (fluorescent) yellow shades having good fastness to washing, light and oxidative coppering.

EXAMPLE 2

5.2 Parts of the disodium salt of 4-aminoaphthalic anhydride-3,6-disulphonic acid, 5.8 parts of the disodium salt of 4-acetylamino-4'-aminostilbene-2,2'-disulphonic acid and 6 parts of sodium acetate are added to 150 parts of water and the solution is stirred under reflux for 4 hours. After cooling, 20 parts of potassium acetate are added and the precipitate is collected by filtration and added to 200 parts of water. This solution is stirred under reflux while 51 parts of hydrochloric acid (s.g. 1.18) are added and then stirred under reflux for a further 50 minutes. After cooling, the precipitated solid is collected by filtration and added to 250 parts of water. Caustic liquor (s.g. 1.35) is added dropwise to the stirred suspension until the pH is at 7 and a clear solution has been obtained. This is cooled to 0°–5°C and added to a stirred suspension of cyanuric chloride prepared by adding a solution of 2.5 parts of cyanuric chloride in 10 parts of warm acetone to a mixture of 50 parts of ice, 50 parts of water and 0.5 parts of dispersing agent. The mixture is stirred at 0°–5°, pH 6–7 for 1 hour before being screened. A solution of 5 parts of potassium dihydrogen orthophosphate and 2.5 parts of disodium hydrogen orthophosphate in 25 parts of water is added to the clear filtrate and the product is isolated by the addition of 40 parts of sodium chloride. After being collected by filtration the product is pasted with a mixture of 0.5 parts of potassium dihydrogen orthophosphate and 0.25 parts of disodium hydrogen orthophosphate. After drying the dyestuff is found to contain 2 moles of hydrolysable chlorine per mole of dyestuff and, when applied to cellulosic fibres in conjunction with an acid binding agent, to dye the fibres in greenish yellow shades somewhat redder and less fluorescent than Example 1 but with the same good fastness to light and wet treatments.

Further Examples of the invention may be found in the accompanying table in which the compound of formula (X) the value of n being given in column 2, is allowed to react with the compound named in column 3. The derived dyestuffs colour cellulosic fibres in greenish-yellow shades with, in general, the compounds where $n = 1$ leading to a slightly redder and less fluorescent colour. DCT represents 2,4-dichloro-s-triazine.

| Example | n | ACYLATING AGENT |
|---|---|---|
| 3 | 1 | 6-(3'-sulphophenylamino)DCT |
| 4 | 0 | 6-(4'-sulphophenylamino)DCT |
| 5 | 0 | 2,4,6-trichloropyrimidine |
| 6 | 1 | 2,4,5,6-tetrachloropyrimidine |
| 7 | 1 | 6-(2',5'-disulphophenylamino)DCT |
| 8 | 0 | cyanuric bromide |
| 9 | 0 | 2,4,6-tribromopyrimidine |
| 10 | 0 | carbyl sulphate |
| 11 | 1 | 2,2,3,3-tetrafluorocyclobutane carbonyl chloride |
| 12 | 0 | β-(2,2,3,3-tetrafluorocyclobutyl)acryloyl chloride |
| 13 | 0 | 6-(2',5'-disulphophenylamino)DCT |
| 14 | 0 | 6-amino DCT |
| 15 | 1 | 2,3,3-trifluorocyclobut-1-ene carbonyl chloride |
| 16 | 0 | β-(2,3,3-trifluorocyclobut-1-enyl)acryloyl chloride |
| 17 | 0 | 2,3-dichloroquinoxaline-5-carbonyl chloride |
| 18 | 0 | 2,3-dichloroquinoxaline-6-carbonyl chloride |
| 19 | 0 | 2,3-dichloroquinoxaline-5-sulphonyl chloride |
| 20 | 1 | 2,3-dichloroquinoxaline-6-sulphonyl chloride |
| 21 | 1 | 2,4-dichloroquinazoline-6-sulphonyl chloride |
| 22 | 0 | 2,4-dichloroquinazoline-7-sulphonyl chloride |
| 23 | 0 | 2,4,6-trichloroquinazoline-7-sulphonyl chloride |
| 24 | 1 | 2,4,6-trichloroquinazoline-8-sulphonyl chloride |
| 25 | 0 | 2,4,7-trichloroquinazoline-6-sulphonyl chloride |
| 26 | 0 | 2,4,8-trichloroquinazoline-6-sulphonyl chloride |
| 27 | 0 | 6-(6'-sulphonaphth-2'-ylamino)DCT |
| 28 | 0 | 2,4-dichloroquinazoline-6-carbonyl chloride |
| 29 | 0 | 1,4-dichlorophthalazine-6-carbonyl chloride |
| 30 | 0 | 2,4-dichloropyrimidine-6-carbonyl chloride |
| 31 | 1 | β-(4,5-dichloropyridazonyl-1-)propionyl chloride |
| 32 | 0 | 1-(4'-chloroformylphenyl)-4,5-dichloro-6-pyridazone |
| 33 | 1 | 1-(4'-chlorosulphonylphenyl)-4,5-dichloro-6-pyridazone |
| 34 | 1 | 1-(4'-chlorosulphonylphenyl)-4,5-dichloro-6-pyridazone |
| 35 | 0 | 6-(5'-sulphonaphth-2'-yl)-DCT |
| 36 | 0 | 2,4,6-trifluoro-5-chloropyrimidine |
| 37 | 0 | 2-methylsulphonyl-4,5-dichloro-6-methyl pyrimidine |
| 38 | 1 | 5-methyl-2,4,6-trichloropyrimidine |
| 39 | 0 | 5-cyano-2,4,6-trichloropyrimidine |
| 40 | 0 | 6-ethylamino DCT |
| 41 | 1 | 6-(4'-β-sulphatoethylsulphonylphenylamino)-DCT |
| 42 | 1 | 6-(3'-β-sulphatoethylsulphonylphenylamino)-DCT |
| 43 | 1 | 6-(4'-carboxyphenylamino)-DCT |
| 44 | 0 | 5-nitro-2,4,6-trichloropyrimidine |
| 45 | 0 | 2,4-dichloro-5-nitro-6-methylpyrimidine |
| 46 | 0 | 6-N-ω-sulphomethylphenylamino-DCT |
| 47 | 1 | 6-(5'-sulphonaphth-1'-ylamino)-DCT |
| 48 | 0 | 2,4-dichloro-5-nitropyrimidine |
| 49 | 0 | 5-ethoxycarbonyl-2,4-dichloropyrimidine |
| 50 | 0 | 2,4-dichloropyrimidine-5-carbonyl chloride |
| 51 | 0 | 6-methoxy DCT |
| 52 | 1 | 6-isopropoxy-DCT |
| 53 | 0 | 6-(4'-sulphophenoxy))-DCT |
| 54 | 1 | 4,4'-bis-[2'',4''-dichloro-s-triazin-6''-ylamino]-diphenylurea-2,2'-disulphonic acid (½ mole) |
| 55 | 1 | 4,4'-bis-[2'',4''-dichloro-s-triazin-6''-ylamino]-diphenoxyethane-2,2'-disulphonic acid (½ mole) |
| 56 | 0 | 4,4'-bis-[2'',4''-dichloro-s-triazin-6''-ylamino]-diphenylethane-2,2'-disulphonic acid (½ mole) |
| 57 | 0 | 4,4'-bis-[2'',4''-dichloro-s-triazin-6''-ylamino]-diphenyl-2,2'-disulphonic acid (½ mole) |
| 58 | 1 | 3,7-bis-[2',4'-dichloro-s-triazin-6'-ylamino]-naphthalene-1,5-disulphonic acid (½ mole) |

EXAMPLE 59

8.5 Parts of the dyestuff described in Example 1 as the tetra sodium salt are dissolved in 200 parts of water, to the solution are added 2 parts of metanilic acid and the solution is then stirred at 30°–35°, pH 6.5–7.5 for 1 hour. The product is precipitated by the addition of 40 parts of sodium chloride and is collected by filtration and dried. Analysis reveals the dyestuff to contain one mole of hydrolysable chlorine per mole of dyestuff, and, when applied to cellulosic fibres in conjunction with an acid-binding agent, it is found to colour the fibres in bright fluorescent greenish-yellow shades having good fastness to washing, light and oxidative coppering.

Further examples of the invention can be found in the following Table in which the compound of formula (X) in which the value of $n$ is given in column 2 is reacted first with cyanuric chloride and then with the compound named in column 3. The dyestuffs yield fluorescent greenish-yellow shades on cellulosic fibres having good light and wet fastness.

| Example | n | |
|---|---|---|
| 60 | 1 | Ammonia (6 moles) |
| 61 | 0 | N-methyltaurine |
| 62 | 0 | Phenol |
| 63 | 0 | ethanolamine |
| 64 | 0 | 5-sulphoanthranilic acid |
| 65 | 1 | aniline-3,5-disulphonic acid |
| 66 | 0 | taurine |
| 67 | 1 | 7-aminonaphthalene-1,5-disulphonic acid |
| 68 | 0 | metanilic acid |
| 69 | 0 | aniline-3,5-disulphonic acid |
| 70 | 1 | 2-aminotoluene-4-sulphonic acid |
| 71 | 0 | 2-aminotoluene-4,5-disulphonic acid |
| 72 | 0 | 6-hydroxynaphthalene-2-sulphonic acid |
| 73 | 0 | 4,4'-diaminodiphenylurea-2,2'-disulphonic acid (½ mole) |
| 74 | 1 | 4,4'-diaminodiphenylsulphide-2,2'-disulphonic acid (½ mole) |
| 75 | 0 | dehydrothio-p-toluidine sulphonic acid |
| 76 | 0 | 3-aminoindazole-5-sulphonic acid |
| 77 | 0 | 4,4'-diaminodiphenylsulphone (½ mole) |
| 78 | 1 | 4,4'-diaminostilbene-2,2'-disulphonic acid (½ mole) |
| 79 | 1 | ethylene diamine (½ mole) |
| 80 | 0 | 3,7-diaminonaphthalene-1,5-disulphonic acid (½ mole) |

EXAMPLE 81

8.4 parts of the compound prepared as in Example 1 as the tetrasodium salt are dissolved in 200 parts of water and the solution is cooled to 0–5°. 1.76 parts of 2,4-diaminobenzene sulphonic acid are added and the pH is adjusted to 7 by the addition of 2-N sodium carbonate solution. The solution is stirred and warmed up to 30° during the course of 1 hour and then the pH of the solution is raised to 7 by the addition of 2N sodium carbonate and stirred for a further ½ hour at 30°, pH 7. 40 parts of sodium chloride are added and the product is collected by filtration. It is dissolved in 150 parts of water, cooled to 0°–5° and added to a stirred suspension of 2.4 parts of 2,4-dichloro-6-amino-s-triazine in 15 parts of acetone, 50 parts of water and 0.5 parts of dispersing agent. The mixture is stirred at 40°–45°, pH 6–7 for 3 hours, screened, and the product isolated by salting to 25% w/v with sodium chloride. After collection by filtration and drying, the dyestuff is found to contain 2 moles of hydrolysable chlorine per mole of dyestuff and, when applied to cellulosic fibres in conjunction with an acid-binding agent to dye the fibres in bright fluorescent greenish-yellow shades fast to washing, light and oxidative coppering.

Further examples of the above invention are given in the accompanying table in which the compound of formula (X), in which the value of $n$ is given in column 2, is treated successively with cyanuric chloride, the diamine named in column 3, and the condensation product of cyanuric chloride with 1 mole of the compound named in column 4. The dyestuffs give bright fluorescent yellow shades on cellulosic fibres having good all round fastness properties.

| Example | n | | |
|---|---|---|---|
| 82 | 0 | 2,5-diaminobenzene sulphonic acid | metanilic acid |
| 83 | 0 | 2,5-diaminobenzene-1,4-disulphonic acid | phenol |
| 84 | 1 | 2,4-diaminobenzene sulphonic acid | ammonia (6 moles) |
| 85 | 0 | 4,6-diaminobenzene-1,3-disulphonic acid | sulphanilic acid |
| 86 | 1 | " | o-toluidine |
| 87 | 0 | 2,5-diaminobenzene sulphonic acid | 2-aminotoluene-4-sulphonic acid |
| 88 | 0 | " | 4-aminobenzoic acid |
| 89 | 1 | 2,4-diaminobenzene sulphonic acid | aniline-3,5-disulphonic acid |
| 90 | 1 | " | 6-aminonaphthalene-2-sulphonic acid |
| 91 | 0 | 2,5-diaminobenzene-1,4-disulphonic acid | None |
| 92 | 1 | " | None |

EXAMPLE 93

9 parts of the compound made as described in Example 59 are dissolved in 150 parts of water at 30° and pH 7. 4 parts of pyridine are added and the solution is stirred at 70°–80° until the liberation of hydrolysable chlorine is complete. After cooling and the addition of 15 parts of sodium chloride the precipitated dyestuff is collected by filtration and dried. When applied to cellulosic fibres at an alkaline pH it colours the fibres in bright fluorescent greenish-yellow shades fast to washing and light.

Replacement of the pyridine by an equivalent amount of nicotinic acid yields a dyestuff of similar properties.

EXAMPLE 94

9 parts of the compound made as described in Example 59 are dissolved in 150 parts of water at 30° and pH 7. Three parts of trimethylamine are added and the solution is stirred at 30°–35° until the release of hydrolysable chlorine is complete. After neutralisation to pH 7 the dyestuff is precipitated by salting to 15% w/v with sodium chloride, filtered and dried. It colours cellulosic fibres, when applied at alkaline pH in fluorescent greenish-yellow shades with good fastness properties.

The trimethylamine can be replaced by an equivalent amount of diazabicyclo-octane to yield a dyestuff with similar shade and fastness properties.

EXAMPLE 95

9 parts of the compound made as described in Example 59, 150 parts of water, 4 parts of pyridine and 5 parts of sodium sulphite are stirred at 40°–50° until sulphiting is complete as judged by the liberation of hydrolysable chlorine. The dyestuff is precipitated by salting to 25% w/v with sodium chloride and, after collection by filtration, is dried. On application to cellulosic fibres in conjunction with an acid binding agent, it dyes the fibres in bright fluorescent greenish-yellow shades fast to washing and light.

We claim:
1. A dyestuff of the formula

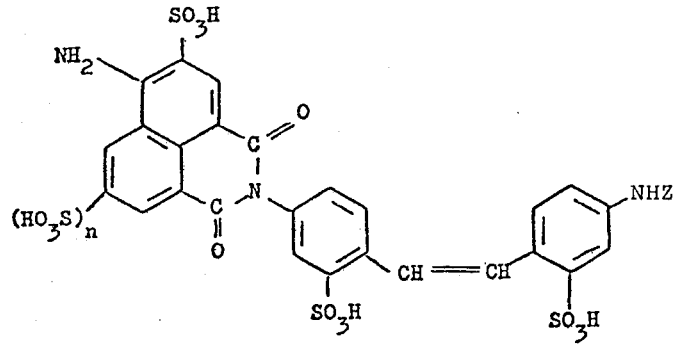

wherein $n$ is 0 or 1 and Z is a cellulose reactive group selected from the group consisting of sulphatoethylsulphonyl, tetrafluorocyclobutane carbonyl, trifluorocyclobutane carbonyl, tetrafluorocyclobutylacryloyl, trifluorocyclobutyl-acryloyl, dichloroquinoxaline-sulphonyl, dichloroquinoxaline-carbonyl, dichloroquinazoline-sulphonyl, trichloroquinazoline-sulphonyl, dichloroquinazoline-carbonyl, dichlorophthalazine-carbonyl, dichloropyridazonylpropionyl, methanesulphonylchloro-methylpyrimidyl, dichloropyridazonylbenzoyl, dichloropyridazonyl-benzene sulphonyl, dibromo-s-triazinyl, dichloropyrimidyl, trichloropyrimidyl, dibromopyrimidyl, methyl-dichloropyrimidyl, cyano-dichloropyrimidyl, nitro-dichloropyrimidyl, lower alkoxy carbonyl-dichloropyrimidyl,

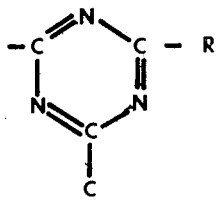

wherein R is Cl, lower alkoxy, phenoxy, sulphophenoxy, sulphonaphthoxy, $-NR_1R_2$ wherein $R_1$ is H, lower alkyl or $CH_2SO_3H$ and $R_2$ is H, hydroxy lower alkyl, phenyl, sulphophenyl, disulphophenyl, carboxyphenyl, sulphatoethylsulphonylphenyl, sulpho-carboxyphenyl, sulphotolyl, disulphotolyl, sulphonaphthyl, disulphonaphthyl, methyl-sulphobenzthiazolylphenyl, sulphoindazolyl, or

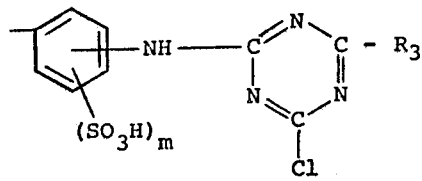

wherein $m$ is 1 or 2 and $R_3$ is Cl, $NH_2$, phenoxy or $NHR_4$ wherein $R_4$ is sulphophenyl, tolyl, sulphotolyl, carboxyphenyl, disulphophenyl or sulphonaphthyl.

2. The dyestuff of claim 1 wherein Z is dichloro-s-triazine.

3. A dyestuff as claimed in claim 1 having the formula

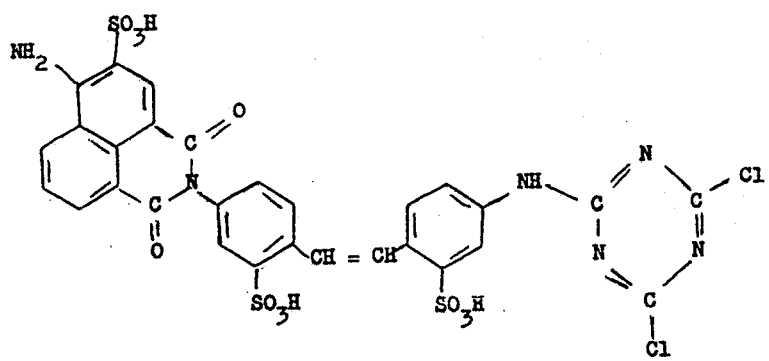

4. A dyestuff of the formula

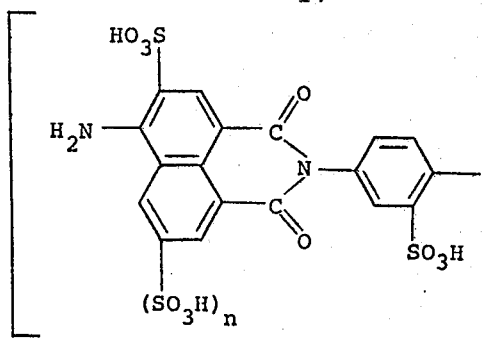
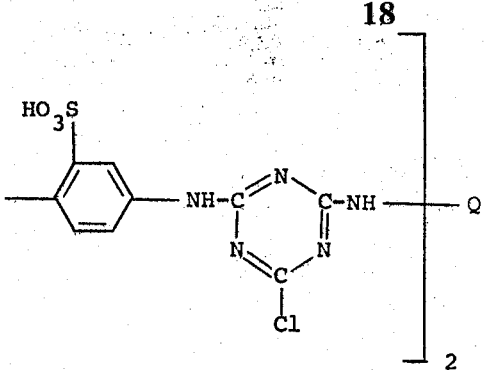
wherein Q is a divalent radical selected from the group consisting of ethylene, disulphonaphthylene, diphenylenesulphone and
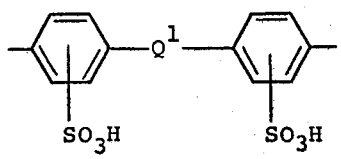
wherein $Q^1$ is NH—CO—NH, $OCH_2CH_2O$, a direck link, S or CH=CH.